(12) United States Patent
Yuan et al.

(10) Patent No.: US 9,190,085 B1
(45) Date of Patent: Nov. 17, 2015

(54) WAVEGUIDE WITH REFLECTIVE GRATING FOR LOCALIZED ENERGY INTENSITY

(71) Applicant: Western Digital (Fremont), LLC, Fremont, CA (US)

(72) Inventors: Hongxing Yuan, San Ramon, CA (US); Jinshan Li, San Jose, CA (US); Zhong Shi, Dublin, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/321,786

(22) Filed: Jul. 1, 2014

Related U.S. Application Data

(60) Provisional application No. 61/951,618, filed on Mar. 12, 2014.

(51) Int. Cl.
| | |
|---|---|
| G11B 7/00 | (2006.01) |
| G11B 5/48 | (2006.01) |
| G11B 7/1384 | (2012.01) |
| G11B 5/60 | (2006.01) |
| G11B 7/12 | (2012.01) |
| G02B 6/34 | (2006.01) |
| G11B 5/00 | (2006.01) |

(52) U.S. Cl.
CPC ............ *G11B 5/4866* (2013.01); *G11B 5/6088* (2013.01); *G11B 7/1206* (2013.01); *G11B 7/1384* (2013.01); *G02B 6/34* (2013.01); *G11B 2005/0021* (2013.01)

(58) Field of Classification Search
CPC ...................... G11B 5/4866; G11B 2005/0021; G11B 5/314; G11B 5/6088; G11B 2005/001; G11B 7/1206; G11B 7/1263; G02B 6/1228; G02B 6/125; G02B 6/24; G02B 6/02114; G02B 6/022; G06F 1/0134; G06F 1/01708
USPC ................. 369/13.33, 13.13, 112.27, 112.09; 385/37, 24, 16, 28, 32
See application file for complete search history.

(56) References Cited

U.S. PATENT DOCUMENTS

| | | | |
|---|---|---|---|
| 4,743,083 | A | 5/1988 | Schimpe |
| 5,625,729 | A | 4/1997 | Brown |
| 6,016,290 | A | 1/2000 | Chen et al. |
| 6,018,441 | A | 1/2000 | Wu et al. |
| 6,025,978 | A | 2/2000 | Hoshi et al. |
| 6,025,988 | A | 2/2000 | Yan |
| 6,032,353 | A | 3/2000 | Hiner et al. |
| 6,033,532 | A | 3/2000 | Minami |
| 6,034,851 | A | 3/2000 | Zarouri et al. |
| 6,043,959 | A | 3/2000 | Crue et al. |
| 6,046,885 | A | 4/2000 | Aimonetti et al. |
| 6,049,650 | A | 4/2000 | Jerman et al. |
| 6,055,138 | A | 4/2000 | Shi |

(Continued)

FOREIGN PATENT DOCUMENTS

| | | |
|---|---|---|
| EP | 1501076 A1 | 1/2005 |
| EP | 1498878 B1 | 4/2008 |

*Primary Examiner* — Ali Neyzari

(57) ABSTRACT

An apparatus includes a waveguide with first and second sections, and a junction coupling the first and second waveguide sections together. The first waveguide section has a first reflective device and the second section comprising a second reflective device arranged to generate a standing wave in the waveguide with maximum energy wave intensity at a target region of the waveguide in response to an incident energy wave being provided into at least one of the waveguide sections.

10 Claims, 5 Drawing Sheets

(56) References Cited

U.S. PATENT DOCUMENTS

| | | | |
|---|---|---|---|
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,275,453 B1 | 8/2001 | Ueyanagi et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,094 B1 | 4/2002 | Gill |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |

(56) References Cited

U.S. PATENT DOCUMENTS

| | | |
|---|---|---|
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,671,127 B2 | 12/2003 | Hsu et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,195 B2 | 2/2004 | Miyanishi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,191 B1 | 7/2004 | Yan et al. |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,834,027 B1 | 12/2004 | Sakaguchi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,975,580 B2 | 12/2005 | Rettner et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,027,700 B2 | 4/2006 | Challener |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,149,055 B2 | 12/2006 | Clinton et al. |
| 7,154,715 B2 | 12/2006 | Yamanaka et al. |
| 7,170,713 B2 | 1/2007 | Gider et al. |
| 7,170,725 B1 | 1/2007 | Zhou et al. |
| 7,171,080 B2 | 1/2007 | Rausch |
| 7,177,117 B1 | 2/2007 | Jiang et al. |
| 7,190,539 B1 | 3/2007 | Nibarger |
| 7,193,815 B1 | 3/2007 | Stoev et al. |
| 7,193,817 B2 | 3/2007 | Lille |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,367 B2 | 5/2007 | Clinton et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,268 B2 | 9/2007 | Challener et al. |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,330,404 B2 | 2/2008 | Peng et al. |
| 7,333,295 B1 | 2/2008 | Medina et al. |

(56) References Cited

U.S. PATENT DOCUMENTS

| | | |
|---|---|---|
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,391,590 B2 | 6/2008 | Matono et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,660 B1 | 10/2008 | Jin et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,500,255 B2 | 3/2009 | Seigler et al. |
| 7,505,227 B2 | 3/2009 | Lee et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,567,387 B2 | 7/2009 | Itagi et al. |
| 7,583,466 B2 | 9/2009 | Kermiche et al. |
| 7,595,967 B1 | 9/2009 | Moon et al. |
| 7,596,072 B2 | 9/2009 | Buechel et al. |
| 7,612,965 B2 | 11/2009 | Kurihara et al. |
| 7,639,457 B1 | 12/2009 | Chen et al. |
| 7,649,677 B2 | 1/2010 | Jin et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,839,497 B1 | 11/2010 | Rausch et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,961,417 B2 | 6/2011 | Seigler et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,031,561 B2 | 10/2011 | Hellwig et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |

(56) References Cited

U.S. PATENT DOCUMENTS

| | | | |
|---|---|---|---|
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 * | 3/2014 | Krichevsky et al. ........ 369/13.24 |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 9,007,879 B1 * | 4/2015 | Cao et al. ................... 369/13.33 |
| 2001/0006435 A1 | 7/2001 | Ichihara et al. |
| 2001/0017820 A1 | 8/2001 | Akiyama et al. |
| 2002/0154451 A1 | 10/2002 | Dimitrov et al. |
| 2003/0039443 A1 | 2/2003 | Catchmark et al. |

(56) References Cited

U.S. PATENT DOCUMENTS

| | | |
|---|---|---|
| 2003/0067717 A1 | 4/2003 | Garfunkel et al. |
| 2003/0184903 A1 | 10/2003 | Challener |
| 2003/0198146 A1 | 10/2003 | Rottmayer et al. |
| 2004/0001420 A1 | 1/2004 | Challener |
| 2004/0027728 A1 | 2/2004 | Coffey et al. |
| 2004/0223249 A1 | 11/2004 | Kang et al. |
| 2004/0228022 A1 | 11/2004 | Ueyanagi |
| 2005/0047013 A1 | 3/2005 | Le et al. |
| 2005/0094319 A1 | 5/2005 | Han et al. |
| 2005/0289576 A1 | 12/2005 | Challener |
| 2006/0098337 A1 | 5/2006 | Guthrie et al. |
| 2007/0081426 A1 | 4/2007 | Lee et al. |
| 2007/0081427 A1 | 4/2007 | Suh et al. |
| 2008/0055343 A1 | 3/2008 | Cho et al. |
| 2008/0068748 A1 | 3/2008 | Olson et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0232225 A1 | 9/2008 | Cho et al. |
| 2010/0290157 A1 | 11/2010 | Zhang et al. |
| 2011/0086240 A1 | 4/2011 | Xiang et al. |
| 2011/0228651 A1 | 9/2011 | Gage et al. |
| 2011/0228652 A1 | 9/2011 | Gage et al. |
| 2012/0111826 A1 | 5/2012 | Chen et al. |
| 2012/0113770 A1 | 5/2012 | Stipe |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

\* cited by examiner

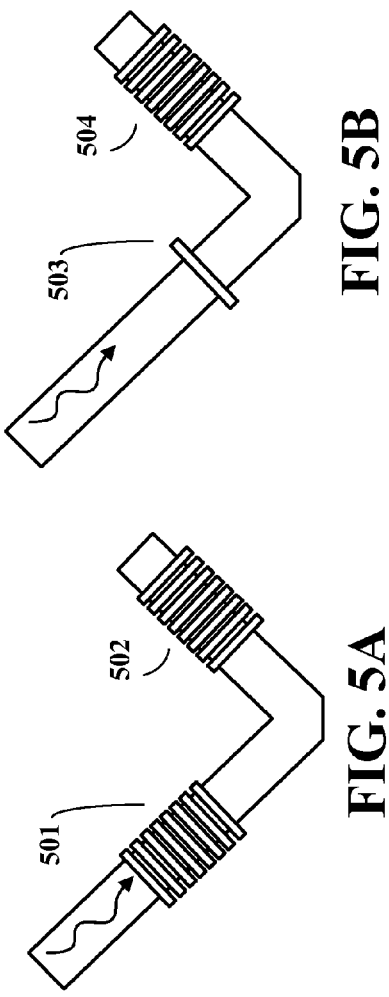
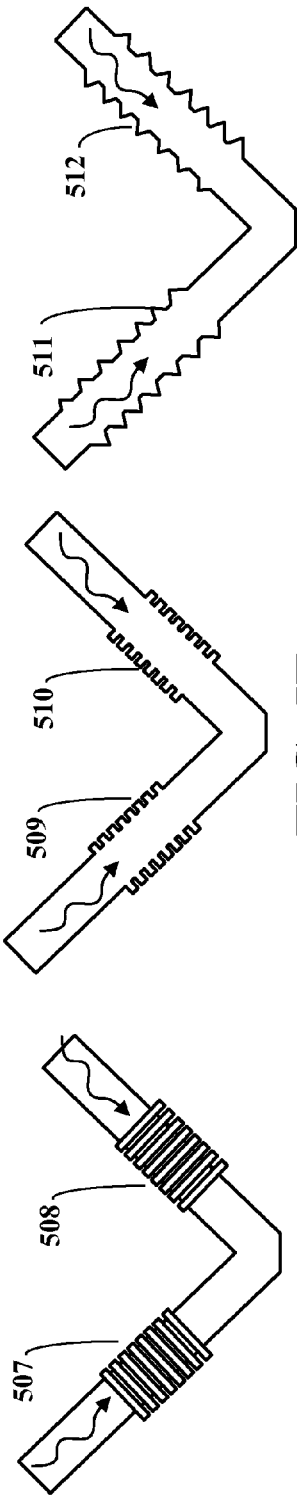

WAVEGUIDE WITH REFLECTIVE GRATING FOR LOCALIZED ENERGY INTENSITY

CROSS-REFERENCE TO RELATED APPLICATION

This application claims the benefit of U.S. Provisional Application Ser. No. 61/951,618 filed on Mar. 12, 2014, which is expressly incorporated by reference herein in its entirety.

BACKGROUND

In magnetic storage devices such as hard disk drives (HDD), read and write heads are used to magnetically write and read information to and from storage media, such as a magnetic storage disk. An HDD may include a rotary actuator, a suspension mounted on an arm of the rotary actuator, and a slider bonded to the suspension to form a head gimbal assembly. In a conventional HDD, the slider carries a write head and read head, and radially flies over the surface of the storage media. The magnetic media disk rotates on an axis, forming a hydrodynamic air bearing between an air bearing surface (ABS) of the slider and the surface of the magnetic media disk. The thickness of the air bearing at the location of the transducer is commonly referred to as "flying height."

The read and write heads are mounted on a trailing edge surface of the slider, which is perpendicular to the air bearing surface (ABS). The magnetic media surface is exposed to the ABS during read and write operations. A Heat Assisted Magnetic Recording (HAMR) device or an Energy Assisted Magnetic Recording (EAMR) device is an enhanced HDD that applies heat to magnetically soften the media surface during recording, particularly useful for high capacity storage with physically smaller bit sizes. The heat may be generated by optical energy from a laser diode coupled to a waveguide, and focused by a near field transducer (NFT) formed on the slider. The NFT is arranged on or near the ABS to transit the focused optical energy to the magnetic media disk surface to produce the heating.

BRIEF DESCRIPTION OF THE DRAWINGS

Various aspects of the present invention will now be presented in the detailed description by way of example, and not by way of limitation, with reference to the accompanying drawings, wherein:

FIGS. 5A-5C show various exemplary configurations of waveguides having reflective grating and/or mirror with single incident wave energy; and FIGS. 5D-5F show various exemplary configurations of waveguides having reflective gratings with dual incident wave energy.

DETAILED DESCRIPTION

Figure 1:
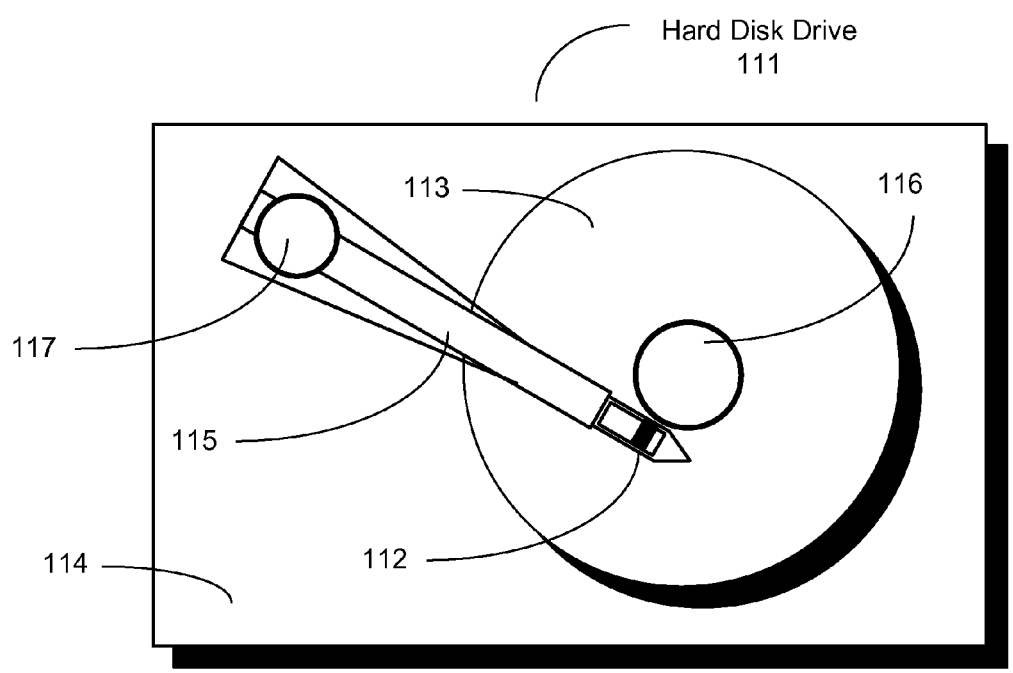
FIG. 1 shows a diagram of an exemplary hard disk drive assembly.

The detailed description set forth below in connection with the appended drawings is intended as a description of various exemplary embodiments and is not intended to represent the only embodiments that may be practiced. The detailed description includes specific details for the purpose of providing a thorough understanding of the embodiments. However, it will be apparent to those skilled in the art that the embodiments may be practiced without these specific details. In some instances, well-known structures and components are shown in block diagram form in order to avoid obscuring the concepts of the embodiments. Acronyms and other descriptive terminology may be used merely for convenience and clarity and are not intended to limit the scope of the embodiments.

The various exemplary embodiments illustrated in the drawings may not be drawn to scale. Rather, the dimensions of the various features may be expanded or reduced for clarity. In addition, some of the drawings may be simplified for clarity. Thus, the drawings may not depict all of the components of a given apparatus or method.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises", "comprising,", "includes" and/or "including", when used herein, specify the presence of the stated features, integers, steps, operations, elements, and/or components, but do not preclude the presence or addition of one or more other features, integers, steps, operations, elements, components, and/or groups thereof.

In the following detailed description, various aspects of the present invention will be presented in the context an optical or dielectric waveguide used to assist magnetic recording on a hard disk drive (HDD). However, those skilled in the art will realize that these aspects may be extended to any suitable application where waveguides are implemented. For example, resonant electromagnetic wave energy in a waveguide antenna may be optimized according to the methods described herein. While the energy source presented in the following detailed description relates to light from a laser, those skilled in the art will also realize that the described aspects may be extended to other forms of energy or electromagnetic waves propagated in a dielectric waveguide. Accordingly, any reference to a waveguide as part of an HDD is intended only to illustrate the various aspects of the present invention, with the understanding that such aspects may have a wide range of applications.

Aspects of a waveguide include first and second sections, and a junction coupling the first and second waveguide sections together. The first waveguide section has a first reflective device and the second section has a second reflective device arranged to generate a standing wave in the waveguide with maximum energy wave intensity at a target region of the waveguide in response to an incident energy wave being provided into at least one of the waveguide sections.

Aspects of a heat assisted magnetic recording (HAMR) apparatus include a waveguide having a cladding and a core, a near field transducer, and an energy source arranged to propagate light through the waveguide to the near field transducer. The core has a plurality of protrusions extending into the cladding.

Aspects of a magnetic hard disk drive include a rotatable magnetic recording disk, a slider having a heat assisted magnetic recording (HAMR) device with a near field transducer (NFT), and a waveguide having first and second sections. A waveguide junction couples the first and second waveguide sections together. The first waveguide section has a first reflective device and the second section has a second reflective device arranged to generate a standing wave in the waveguide with maximum energy wave intensity at a target region of the waveguide in response to an incident energy wave being provided into at least one of the waveguide sections. The NFT is arranged adjacent to the waveguide at the target region. The NFT is configured to couple the energy wave to the surface of the recording disk for heat assisted magnetic recording.

Aspects of a magnetic hard disk drive include a rotatable magnetic recording disk, a slider having a heat assisted magnetic recording (HAMR) device with a near field transducer (NFT), a waveguide including a cladding and a core, the core having a plurality of protrusions extending into the cladding, and an energy source arranged to propagate light through the waveguide to the near field transducer. The NFT is arranged adjacent to the waveguide and configured to couple the light to the surface of the recording disk for heat assisted magnetic recording.

FIG. 1 shows a hard disk drive 111 including a disk drive base 114, at least one disk 113 (such as a magnetic disk, magneto-optical disk, or optical disk), a spindle motor 116 attached to the base 114 for rotating the disk 113. The spindle motor 116 typically includes a rotating hub on which disks are mounted and clamped, a magnet attached to the hub, and a stator. Rotation of the spindle motor hub results in rotation of the mounted disks 113. At least one actuator arm 115 supports at least one head gimbal assembly (HGA) 112 that includes the slider with writing and reading heads. For an EAMR/HAMR enhanced drive, a waveguide and near field transducer are included on the slider as well. During a recording operation of the disk drive 111, the actuator arm 115 rotates at the pivot 117 to position the HGA 112 to a desired information track on the disk 113.

Figure 2:
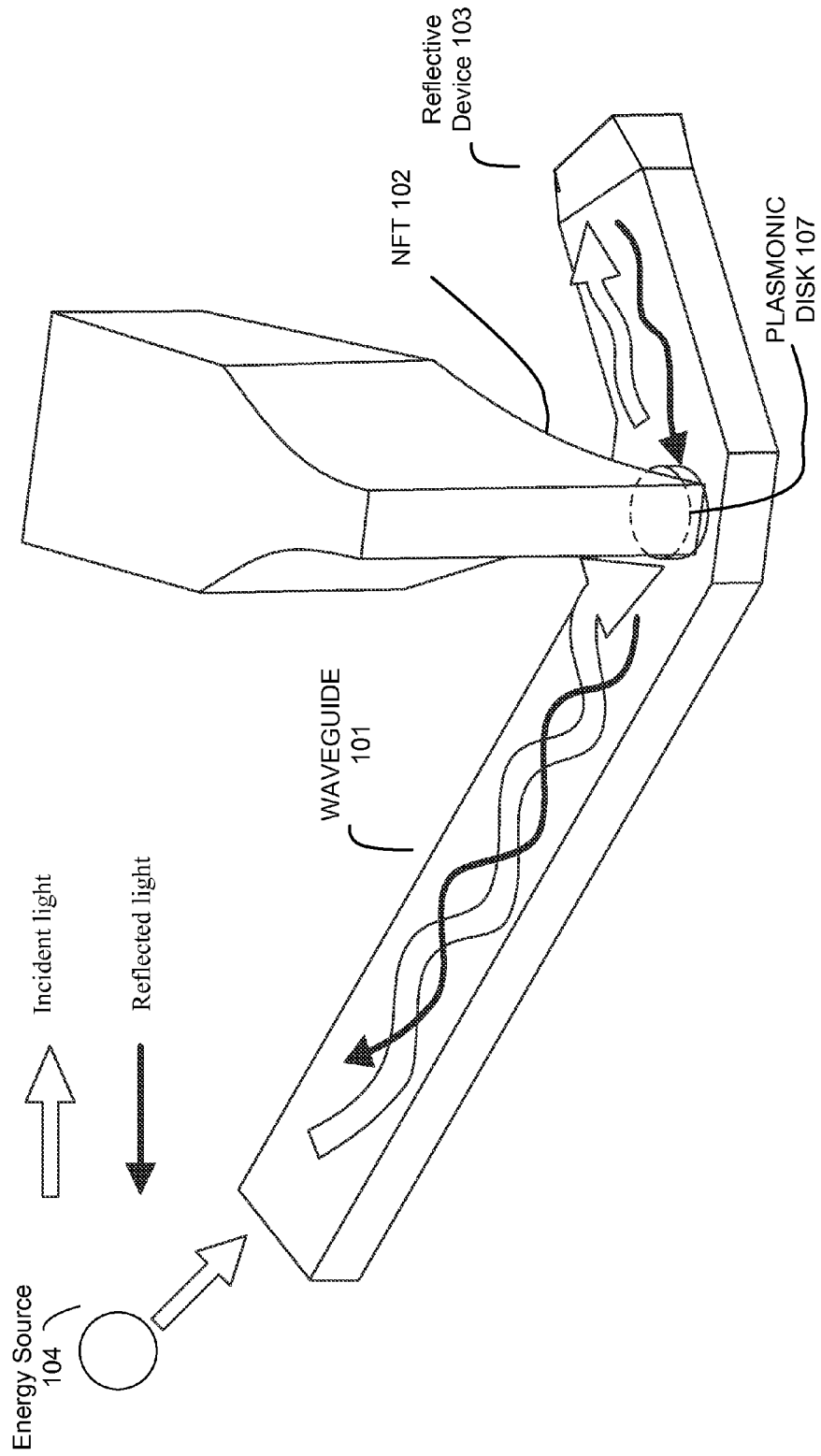
FIG. 2 shows an exemplary waveguide with a reflective mirror to recycle the incident energy wave.

FIG. 2 shows a waveguide 101 configured to receive an energy wave generated by an energy source 103, and may naturally guide the energy wave (e.g., light) to a Near Field Transducer (NFT) 102 arranged adjacent to the waveguide 101. The waveguide 101 and NFT 102 may be disposed on a slider of the HGA 112 shown in FIG. 1. As an example, for an optical energy wave, the energy source 103 may be a laser diode. The NFT 102 may be a passive type NFT which receives energy from the energy source 103 and couples and transfers the energy to the surface of the storage disk 113. For example, the NFT 102 may focus the energy wave from the waveguide 101 to generate a heating spot on the magnetic storage disk 113 to magnetically soften the layers of the disk 113 at a nano-sized spot to assist changing the bit state when writing to the storage disk 113. As a passive NFT, the NFT 102 may operate by a plasmon effect as optical energy interacts with a small plasmonic metal feature, such as the plasmonic disk 107. Alternatively, the small plasmonic metal feature may be configured as pin or a ridge, for example. The plasmonic metal may be one of gold (Au), silver (Ag), copper (Cu), or aluminum (Al) for example. The NFT 102 may be an antenna type NFT as shown in FIG. 2. Alternatively, the NFT 102 may be an aperture type, which utilizes a nano-sized aperture to confine an input optical energy field.

The waveguide 101 may have a slanted taper with a width approximately equal to or greater than the width of the NFT to guide the energy wave to a small area for interaction with the NFT 102. The waveguide 101 may include a core (e.g., a dielectric material core) and a cladding (e.g., a silicon dioxide material). As shown in FIG. 2, the waveguide 101 may be configured with two substantially linear sections, a first section which receives the incident energy, and a second section which includes the reflective device 103 for reflecting the incident energy. Also, the first and second sections of the waveguide 101 may be coupled as shown to form an angular junction at an angle between 0 and 180 degrees.

To recycle the energy wave which passes through the waveguide 101, the reflective device 103 may be arranged at the end of the waveguide 101, as shown in FIG. 2, so the reflected energy wave can be coupled to the NFT 102 in addition to the incident energy wave. A forward propagating wave can interact with a backward propagating wave to form a standing wave along the waveguide 101. One of several constructive interference peaks that are formed at a target region of the waveguide, such as at the junction of the first and second sections for example. The waveguide 101 may be configured with a length for the first section and the second section such that a maximum interference peak for the energy wave occurs exactly at the target region. The NFT 102 may be positioned adjacent to the target region of the waveguide 101, thus providing an optimized efficiency of energy interaction with the waveguide 101.

Figure 3:
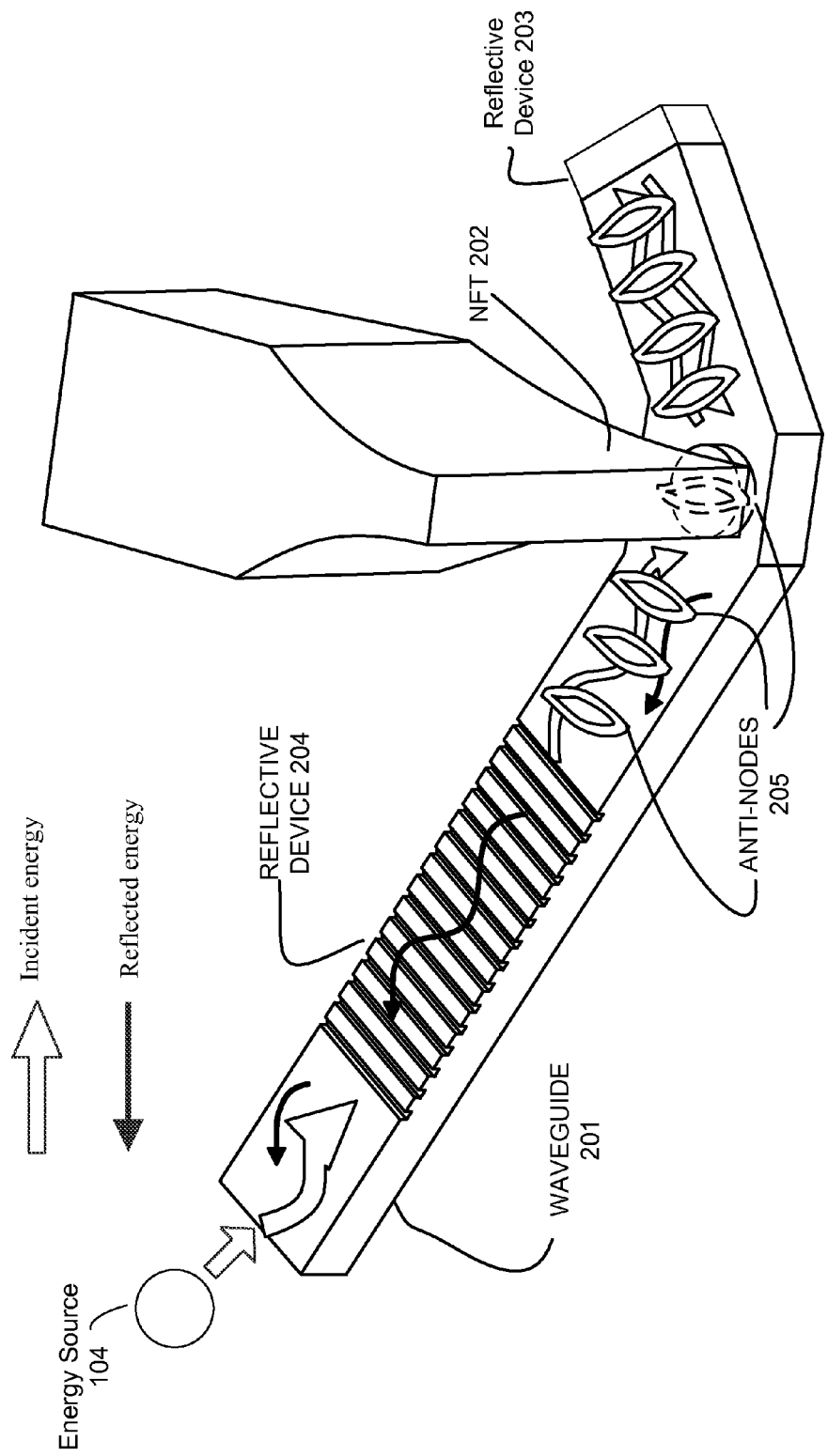
FIG. 3 shows an exemplary waveguide having a reflective grating.

FIG. 3 shows a diagram of an exemplary embodiment of a waveguide 201 that is a variation of the waveguide 101 shown in FIG. 2. In addition to a reflective device 203 at the end of the waveguide 201, another reflective device 204 is arranged on the incident section of the waveguide 201. The reflective device 204 may include a grating to render it functional as a partial reflection mirror, and to further improve the recycling rate of an energy wave within the waveguide 201. The grating of the reflective device 204 may be a Partially Reflective Grating (PRG). The reflective device 203 may include a gold mirror. The waveguide 201 may be configured with a combination of grating dimensions for the reflective device 204 and length the waveguide sections to produce a standing wave pattern with antinodes 205. Reflectance of the reflective device 204, controllable by the grating composition and dimensions, may react with the incident energy wave generated by energy source 201. If the reflectance of the reflective device 204 is high enough, a trapped wave may form the standing wave inside the waveguide as shown by the antinodes 205. A maximum energy amplitude of the antinodes 205 may be produced at a target region of the waveguide 201, by the configuration of the reflective device 204 and the dimensions of the waveguide 201. For example, the target region of the waveguide may be the junction of the first and second waveguide sections. The NFT 202 may be positioned adjacent to the target region of the waveguide 201 at one of such anti-nodes 205.

Figure 4:
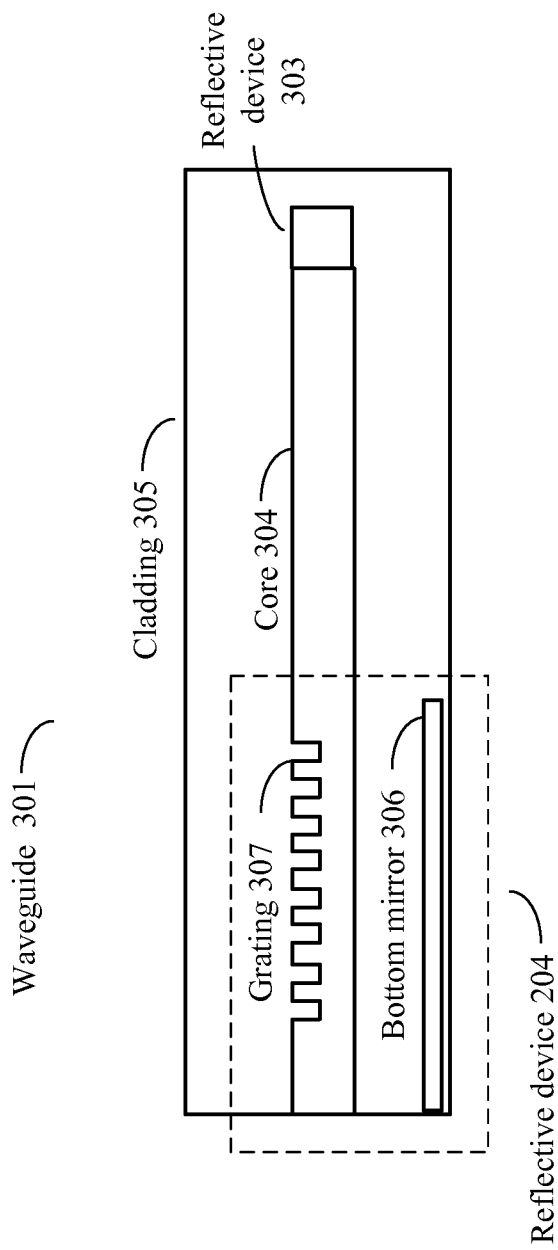
FIG. 4 shows a detail of an exemplary reflective grating.

FIG. 4 shows a diagram of an exemplary detail of the reflective device 204. Waveguide 301 includes a cladding 305 and a core 304. The reflective device 204 may include a grating 307 on one surface of the waveguide 301 and an optional reflective mirror 304 opposite to the grating 307 to collect scattered light. A plane wave may be assumed inside the waveguide if the lateral size is larger compared to the working wavelength. For a core material assumed to be non-absorptive, the peak intensity of each anti-node can be represented by Equation (1):

$$I_m = \frac{(1-R_1)(1+\sqrt{R_2})^2}{(1-\sqrt{R_1 R_2})^2} \quad (1)$$

where:

R1 is reflectance of the reflective device 204, and
R2 is the reflectance of the reflective device 303.

Assuming a practically achievable reflectance R2 that varies from 0 to 90%, reflectance of the R1 for reflective device 204 may be tunable to maximize the peak intensity. As an example, reflective device 204 may be configured with a reflectance R1=60%, where reflective device 303 has a reflectance R2=90%.

In another embodiment, the reflective device 204 may be configured as a retro-reflecting grating 307 and the mirror 306 configured to collect scattered light. The reflectance R1 of reflective device 204 may be tuned by the grating parameters such as grating pitch, grating depth, grating duty cycle and overall size of the grating area. The reflective device 303 may be configured as a mirror with a thin gold layer and with a reflectance greater than 90%. The grating 307 may have a 250 nm pitch, grating depth of 90 nm, and duty cycle of 50% for an assumed working wavelength of 836 nm, and a core material that is $Ta_2O_5$ with refractive index of 2.1. For the cladding material 305 in this example, $Al_2O_3$ with refractive index of 1.65 may be used. The core 304 dimensions may be 150 nm thickness and 300 nm width for example. The reflectance and transmission of this grating 307 can be tuned by the overall size of grating area or the total number of grating pairs, with a grating pair defined as a single "grate" unit (i.e., one peak and one valley).

The length of core 304 may be configured to render the resonance of the energy wave inside the waveguide. As an example, a waveguide may generate a resonance having peak intensity at an antinode 205 using a core length of approximately 2300 nm for a core width 300 nm and core thickness 150 nm and grating configured with pitch of 250 nm, grating depth of 90 nm and 40 grating pairs.

The waveguide may be configured with a grating size (i.e., number of grating pairs) based on estimating a loss for each trip of incident and reflective energy wave interaction with the grating, thus determining the optimal number of grating pairs to maximize the intra-cavity intensity.

FIGS. 5A-5F show additional exemplary embodiments of waveguides having variations for the reflective devices 203, 204 as shown in FIG. 3.

The waveguides shown in FIGS. 5A-5C are configured in an angular configuration similar to the waveguide 201 shown in FIG. 3, with a first section of the waveguide that receives the injected incident energy wave and a second section of the waveguide for reflecting the energy wave to form a standing wave.

FIG. 5A shows an exemplary embodiment of a waveguide configured with a grating 501 and a grating 502, both of which may be configured as an etched grating with the core partially etched away and filled with a cladding material. Grating 501 may be a partially reflective grating and grating 502 may be a highly reflective grating.

FIG. 5B shows an exemplary embodiment of a waveguide configured with a mirror 503 in the first waveguide section and a grating 504 in the second waveguide section The mirror 503 may be formed by a thin Au film with a reflectance that may be tuned by altering the thickness of the Au film. The mirror 503 may function as a partially reflective mirror. The grating 504 may be configured as a highly reflective grating.

FIG. 5C shows an exemplary embodiment of a waveguide configured with two mirrors, the mirror 507 being partially reflective, and the mirror 508 being highly reflective.

The exemplary waveguide embodiments shown in FIGS. 5D-5F are suitable for dual incident energy wave injection, as shown by incident energy wave input into each of the two waveguide sections. With such a configuration, a mirror with Au film, such as mirror 503 as shown in FIG. 5B and mirrors 504, 505 as shown in FIG. 5C, is eliminated.

FIG. 5D shows an exemplary embodiment of a waveguide configured with etched gratings 507 and 508, which may be formed by etching the waveguide core material and lining etched surfaces with a reflective film.

FIGS. 5E and 5F show exemplary embodiments of waveguides that are formed with Width Varying Grating (WVG). As such, the grating 509 and the grating 510 shown in FIG. 5E, and the gratings 511, 512 shown in FIG. 5F maintain the full waveguide interior core dimensions to reduce energy loss for the incident wave and the reflected wave in each section of the waveguide. Along each of gratings 509-512, the cross-sectional area of the waveguide interior is not diminished compared to the cross-sectional area of the waveguide interior elsewhere. The gratings 509-512 for the configurations shown in FIGS. 5E and 5F are constructed by extending the waveguide exterior to form the grating pairs, contrasted with the etched gratings 507 and 508 described above with respect to FIG. 5D. As shown in FIG. 5E, the gratings 509, 510 may be configured as square-shaped extensions of the waveguide width. As shown in FIG. 5F, the gratings 511, 512 may be configured as curve-shaped extensions of the waveguide width. The external gratings 509-512 may be formed by extensions of the core material as protrusions into the cladding material of the waveguide.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An apparatus, comprising:
    a waveguide comprising first and second sections, and a junction coupling the first and second waveguide sections together, the first section comprising a first reflective device and the second section comprising a second reflective device arranged to generate a standing wave in the waveguide with maximum energy wave intensity at a target region of the waveguide in response to an incident energy wave being provided into at least one of the waveguide sections.

2. The apparatus of claim 1, wherein the first reflective device comprises a mirror that is at least partially reflective.

3. The apparatus of claim 1, wherein the second reflective device comprises a mirror.

4. The apparatus of claim 1, wherein the first reflective device comprises a grating that is at least partially reflective.

5. The apparatus of claim 1, wherein the second reflective device comprises a grating that is at least partially reflective.

6. The apparatus of claim 1, wherein the first reflective device comprises partially reflective grating configured with a number of grating pairs that optimizes the maximum energy wave intensity at the target region of the waveguide.

7. The apparatus of claim 1, wherein each of the first and second sections are configured with a length that optimizes the maximum energy wave intensity at the target region of the waveguide.

8. The apparatus of claim 1, wherein a first incident energy wave is provided to the first section, and a second incident energy wave is provided into the second section.

9. The apparatus of claim 1, wherein the partially reflective grating is configured with a grating size and each of the first and second sections are configured with a length that optimizes the maximum energy wave intensity at the target region of the waveguide.

10. The apparatus of claim 1, further comprising a near field transducer arranged adjacent to the target region of the waveguide.

* * * * *